United States Patent
Saluel et al.

(10) Patent No.: US 6,392,934 B1
(45) Date of Patent: May 21, 2002

(54) METHOD FOR READING AND WRITING A DATA STORAGE MEDIUM COMPRISING A MATERIAL WITH A SUCCESSION OF ZONES HAVING A FIRST AND SECOND PHYSICAL STATE RESPECTIVELY

(75) Inventors: Didier Saluel, Saint Marcellin; Bernard Bechevet, Claix, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/807,808

(22) PCT Filed: Nov. 16, 1999

(86) PCT No.: PCT/FR99/02804

§ 371 Date: Apr. 19, 2001

§ 102(e) Date: Apr. 19, 2001

(87) PCT Pub. No.: WO00/30086

PCT Pub. Date: May 25, 2000

(30) Foreign Application Priority Data

Nov. 17, 1998 (FR) .............................. 98 14404

(51) Int. Cl.⁷ .......................... G11C 16/04; B32B 3/02; G11B 7/00
(52) U.S. Cl. .................. 365/189.01; 428/64.4; 369/116
(58) Field of Search ............................ 365/189.01, 163, 365/113, 10; 428/65.3, 64.4; 369/116; 360/104

(56) References Cited

U.S. PATENT DOCUMENTS

| | | | | |
|---|---|---|---|---|
| 5,623,472 A | * | 4/1997 | Bakx et al. | 369/116 |
| 5,635,267 A | * | 6/1997 | Yamada et al. | 428/64.4 |
| 5,870,338 A | * | 2/1999 | Casper | 365/189.01 |
| 5,985,404 A | * | 11/1999 | Yano et al. | 428/65.3 |
| 6,078,471 A | * | 6/2000 | Fiske | 360/104 |

OTHER PUBLICATIONS 206.4 "Electric field Gradient Detection—Theory", Support Note No. 206, (p. 16).
206.4.4, "Surface Potential Detection—Theory", Support Note, No. 206, (p. 31).
Fujiwara, et al., "High Density Storage Memory with Scanning Probe Microscopy", Part 1, No. 5A, May 1996, (pp. 2764–2766).
Ohgami, et al., "Determination of Sign of Surface Charges of Ferroelectric TGS Using Electrostatic Force Microscope Combined with the Voltage Modulation Technique", Part 1, No. 5A, May 1996, (pp. 2734–2735).

\* cited by examiner

Primary Examiner—David Nelms
Assistant Examiner—David Lam
(74) Attorney, Agent, or Firm—Burns, Doane, Swecker & Mathis LLP

(57) ABSTRACT

The present invention relates to a method for reading an information medium (1) comprising a recording layer (14) with a succession of zones of material (14a, 14c) with respective distinct first and second physical states of the material. According to the invention the recording layer is scanned with means (100) for detecting electrical fields.

16 Claims, 3 Drawing Sheets

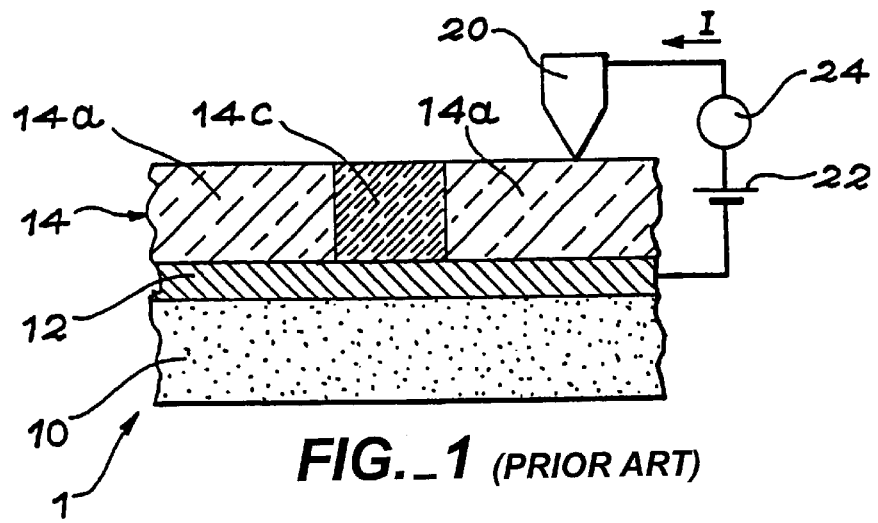
FIG._1 (PRIOR ART)
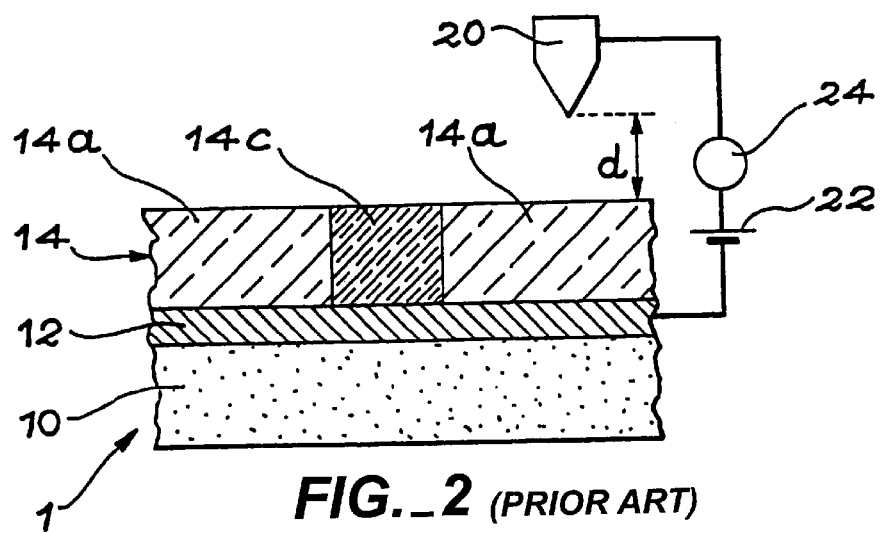
FIG._2 (PRIOR ART)
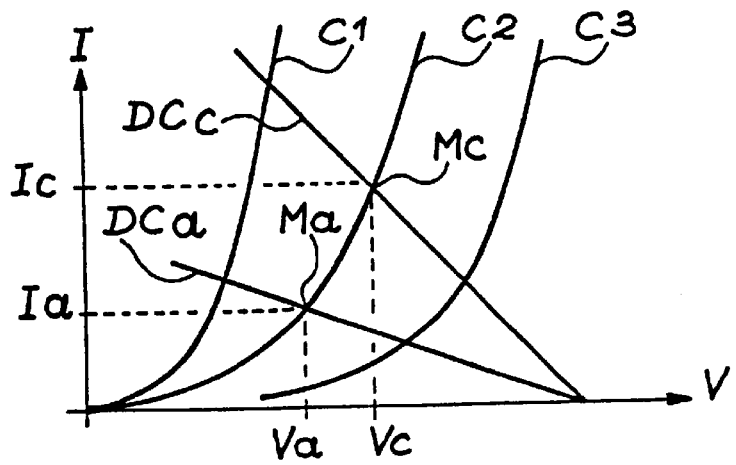
FIG._3 (PRIOR ART)

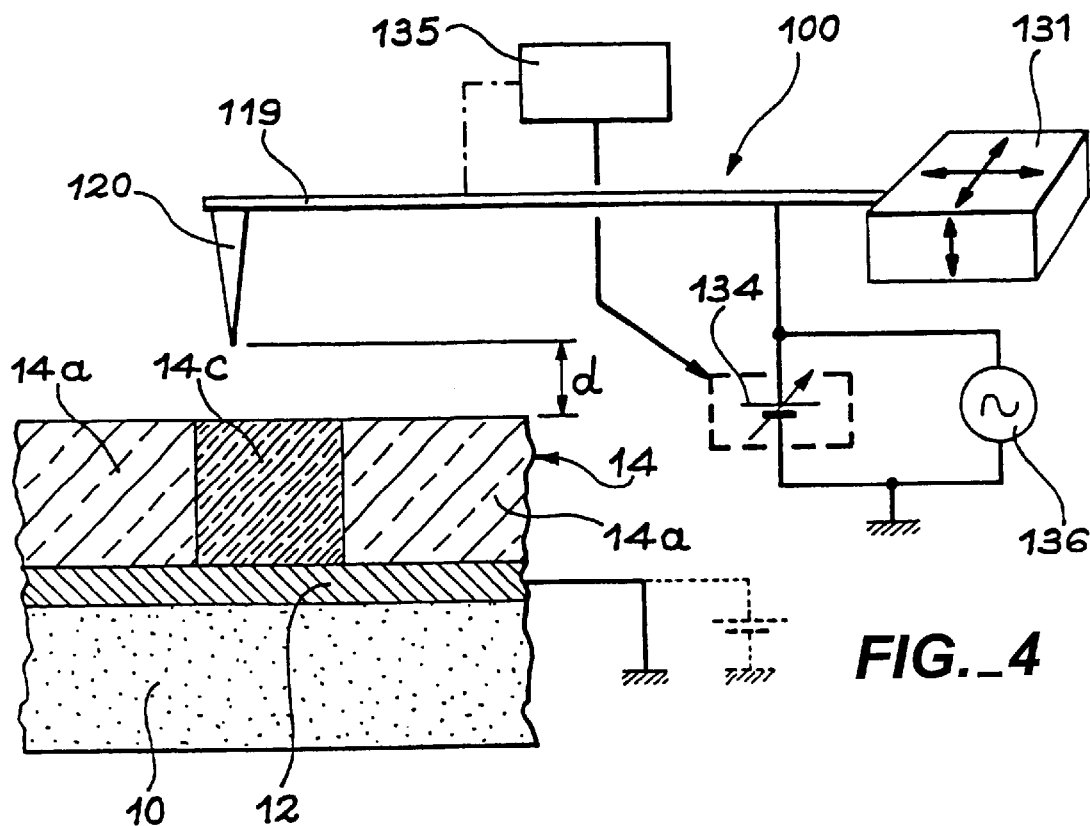
FIG._4
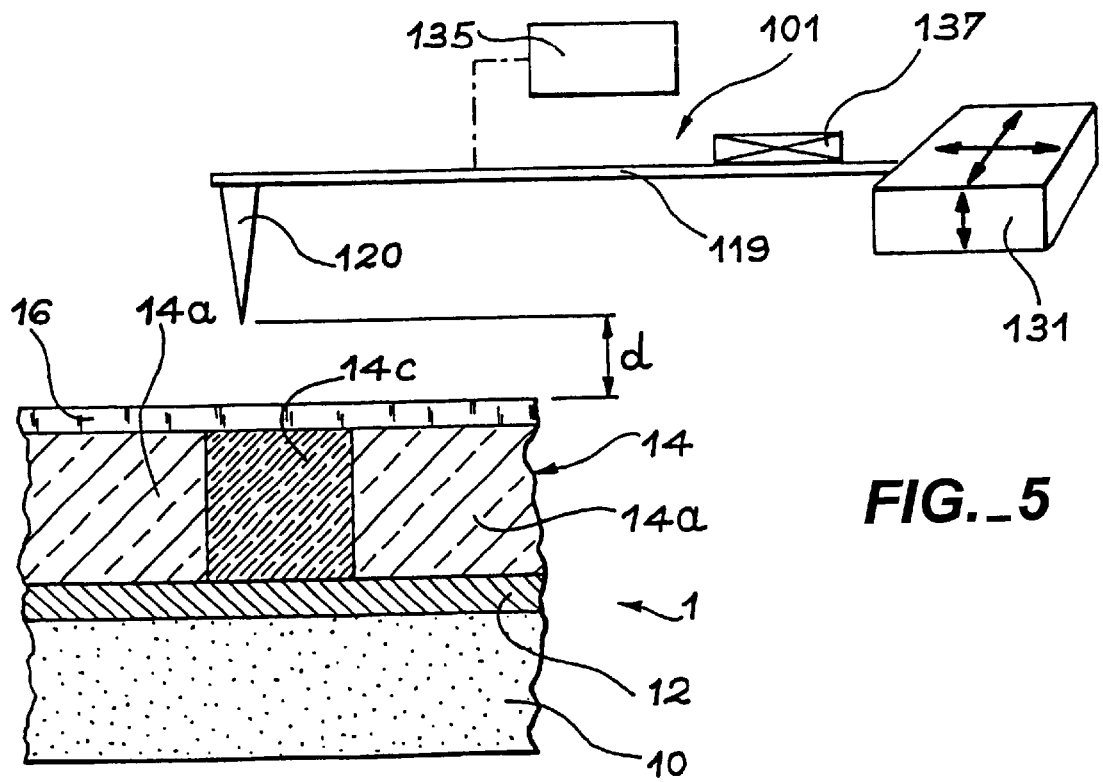
FIG._5

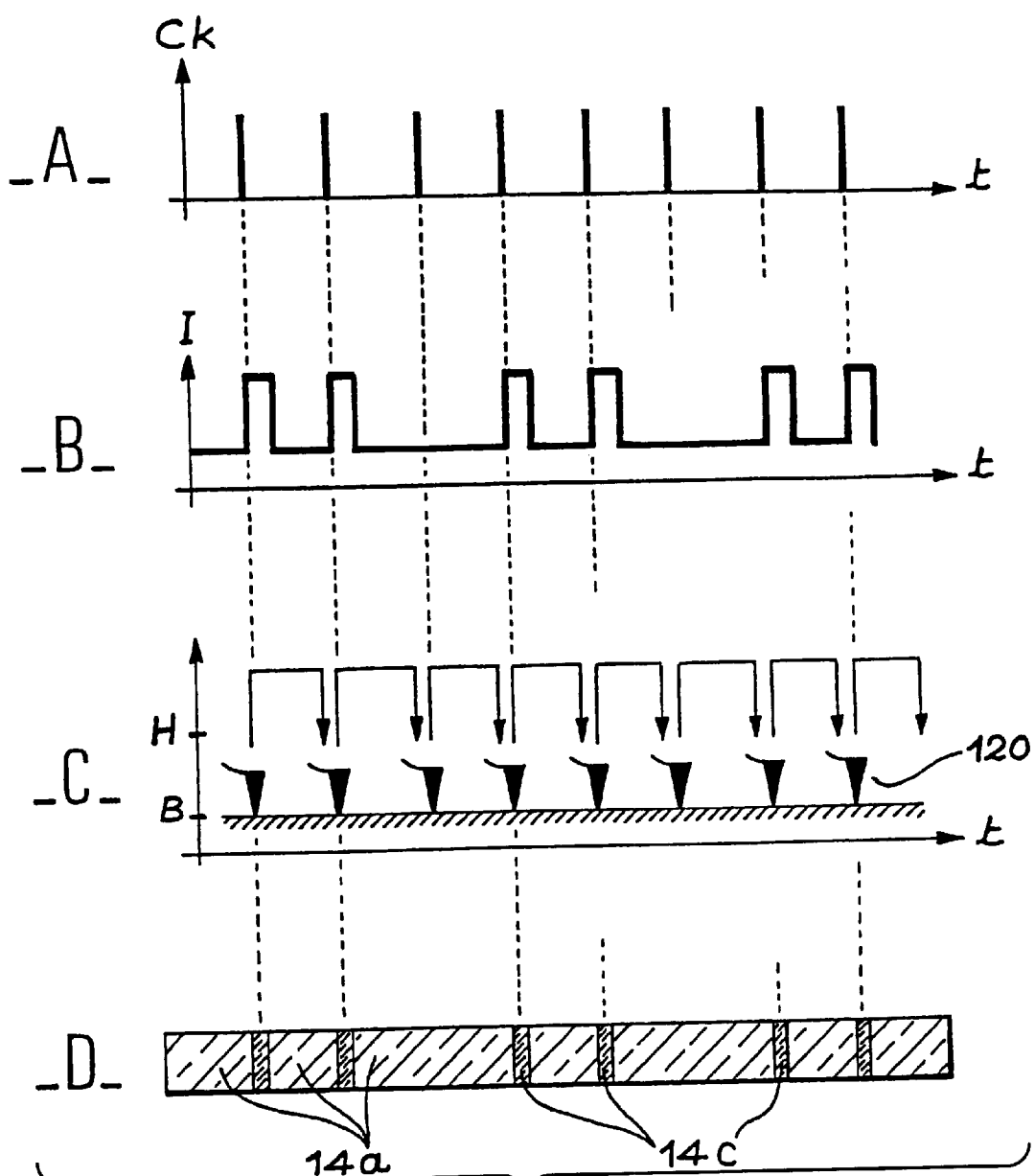
FIG._6

METHOD FOR READING AND WRITING A DATA STORAGE MEDIUM COMPRISING A MATERIAL WITH A SUCCESSION OF ZONES HAVING A FIRST AND SECOND PHYSICAL STATE RESPECTIVELY

This application is a national phase of PCT/FR99/02804 which was filed on Nov. 16, 1999, and was not published in English.

FIELD OF THE INVENTION

The present invention relates to a method for writing and reading on an information medium comprising a recording layer with a succession of zones of material with at least a first and second physical state respectively.

"Physical State" implies a particular structure or composition of the material linked to a physical property that is characteristic of the state.

As an example, a physical state may imply particular doping of the material, a given ferroelectric structure or a crystalline structure of the material. The state of the material results in an electrical or optical property, such as a characteristic resistivity.

In particular, the recording layer may comprise a succession of regions in a crystalline and amorphous state respectively.

In general the invention has applications in recording information. For example, the information may be in the form of digital data, images or sounds.

In particular, the invention may be used in the fields of television and creating computer memories.

BACKGROUND ART

FIG. 1 is a schematic drawing of a system for writing and reading on an information medium according to a known technique based on the distinction between two physical states of a material.

The information medium bears the general reference number 1.

It comprises a substrate medium 10 covered with a layer of an electrical conductor material that constitutes an electrode 12.

A recording layer 14 covers electrode 12. For example, this layer is of a material such as $Ge_2Sb_2Te_5$ that is in either a crystalline or an amorphous state.

Information is recorded in the recording layer using coding in a succession of zones in a first physical state (crystalline) and zones in a second physical state (amorphous).

In the figure the amorphous zones bear the reference 14a and the crystalline zones reference 14c.

The information is recorded by the zones becoming more or less heated such that they change from an amorphous to a crystalline state or vice versa.

The heating is achieved, by means of an electric current that is more or less intense in the various zones of recording layer 14. The current flows between a conductor point 20 applied against a write/read surface of the recording layer and electrode 12. The current is supplied by a generator (not shown in the figure). Point 20 and information medium 1 are displaced relative to one another so as to scan recording layer 14.

This recording technique is called "phase change recording".

The recorded information on medium 1 is also read using conductor point 20. It uses the electrical properties of the recording layer material that has a different resistivity in the amorphous and the crystalline states.

A source of voltage 22 is connected between conductor point 20 and electrode 12 such that a measuring circuit is created with a zone of the recording layer with which point 20 is in contact.

A current carried by the measuring circuit is detected by ammeter measuring means 24 and conductor point 20 is displaced on the surface of the recording layer in order to scan it.

Measuring current I may have two values depending on whether the zone of recording layer 14 in contact with point 20 is amorphous 14a or crystalline 14c. The resistance of recording layer 14 has two values respectively Ra and Rc depending on the amorphous or crystalline state of the material.

In practice, resistance Ra is stronger than resistance Rc, resulting in the following:

Ia=V/Ra if the recording layer is amorphous,

Ic=V/Rc if the recording layer is crystalline.

In these expressions V is the value of the voltage supplied by source of voltage 22.

The higher the Ra/Rc relation, the easier it is to distinguish between these two states.

The above measuring method poses problems linked to the mechanical and electrical contact between the conductor point and the write/read surface of recording layer 14. After a certain number of reading operations the displacement of point 20 against recording layer 14 causes mechanical wear of the point and the recording layer. The wear results in reading errors or inaccuracy.

FIG. 2 shows a second known technique for reading an information medium 1, such as that described, that prevents the problems of mechanical wear mentioned above.

The reading technique uses the tunnel effect.

The equipment used to implement the second reading technique is more or less the same as that described with reference to FIG. 1.

It comprises a data medium 1 consisting of a substrate 10, an embedded electrode 12 and a recording layer 14. The reading apparatus comprises a conductor point 20, a source of voltage 22 and measuring means 24. However, unlike the apparatus in FIG. 1 conductor point 20 is held away from the surface of recording layer 14 by a distance d. Despite this distance a current is still capable of penetrating the recording layer by means of the tunnel effect.

A current-voltage diagram is used to determine the value of the intensity of the current. This type of diagram is shown in FIG. 3. In this diagram voltage V is shown on the abscissas and current I on the ordinates. The current-voltage characteristic is a curve with an elbow, as in tunnel diodes. Three characteristics C1, C2, C3 are plotted in FIG. 3. They show three different distances, d1, d2, d3 respectively, between point 20 and the write/read surface of the recording layer. For the same voltage applied between conductor point 20 and electrode 12, the smaller the distance between the point and the read surface the greater the current carried by the measuring circuit.

In the example shown, distances d1, d2, d3 with characteristics C1, C2, C3 are such that d1<d2<d3.

In the diagram load lines are defined that relate current I to voltage V and that slope depending on the more or less resitive character of the circuit. When the tested zone is amorphous its resistance Ra is great and the drop in voltage is significant. In a crystalline zone resistance Rc is lower and the drop in voltage smaller. The load lines are therefore as shown in FIG. 3 with references DCa and DCc for an amorphous zone 14a and a crystalline zone 14c respectively.

If characteristic C2 is considered relative to a distance d2 the point of operation of the measuring circuit is located at either Ma (if the zone is amorphous) or Mc (if the zone is crystalline). The current-voltage couple is then either Ia–Va (amorphous zone) or Ic–Vc (crystalline zone).

The variables Va, Vc, Ia and Ic are the voltages and currents respectively in amorphous zones 14a and crystalline zones 14c.

Measuring means 24 are used to measure currents Ia or Ic in this second read mode to distinguish the physical state (amorphous or crystalline) of the scanned zones in order to read the information encoded on the recording medium.

The second read mode does not cause wear on the write/read surface of the recording layer or on the micro-point. It does, however, have the drawback of being extremely sensitive to the measurements of distance d separating the micro-point from the recording layer.

As shown in FIG. 3, for a given voltage the current carried in a given zone of the recording medium (amorphous or crystalline) is greatly dependent on 10 distance d (characteristics C1, C2, C3).

Therefore, a crystalline zone could very easily be mistaken for an amorphous zone if distance d between the point and the write/read surface were to be increased.

An error of this kind is likely to occur frequently if distance d is small and the recording medium is not perfectly flat.

The second read mode is also therefore subject to measuring errors.

DISCLOSURE OF THE INVENTION

The aim of the present invention is to provide a recording medium and a method for reading the recording medium that does not have the difficulties and limits of the read techniques described above.

One particular aim is to provide a reading method that does not cause any wear of either the read equipment or recording medium.

Another aim is to provide a reliable reading method that excludes reading errors linked to variations in the distance between the read equipment and the recording medium.

Another aim is to provide an improved information medium suited to the reading method.

Yet another aim is to provide a method for recording on the information medium.

In order to achieve these aims, the invention relates more precisely to a method for reading an information medium comprising a recording layer with a succession of zones of material with distinct first and second physical states of the material respectively. According to the invention the recording layer is scanned with means for detecting electrical fields.

The method of the invention is based on detecting the existence of a measurable electrical field correlated to the succession of zones of a solid material in its different physical states. "Physical state" of the material implies a state linked to the structure or composition of the material as compared to a state linked to an electrical charge, i.e. independent of the structure or composition of the material.

The difference of physical state may be intrinsic, such as a difference of the crystalline or ferroelectric state of the material. The recording layer may therefore comprise a succession of zones having respective crystalline and amorphous states of said material. It may also comprise a succession of zones with a first and second ferroelectric state respectively.

The difference of physical state may also be extrinsic, i.e. obtained by a modification of the composition of the material. The recording layer may, for example, be a layer of semi-conductor material with a succession of zones with a first and second state of distinct doping respectively.

The recording layer may be made of a silicon material or II–IV or III–V compounds. It may also be an alloy with a base of tellurium (Te), and/or germanium (Ge), and/or antimony (Sb), and/or silver (Ag), and/or indium (In), and/or copper (Cu), and/or chrome (Cr), and/or vanadium (V) and/or selenium (Se).

Finally, the material of the recording layer may be a PZT-type ferroelectric material, i.e. Pb, Zr, Ti oxide alloy.

The reading method may use an apparatus for detecting electrical fields that comprises a read head and means for imposing a periodic oscillatory movement on the point. With an apparatus of this kind the reading results from the detection of modifications in the oscillatory mode.

In one version the apparatus may also be equipped with means for applying electrostatic force to the point. In this event the reading results mainly from the detection of variations in the force applied to the point.

The invention also relates to an information medium comprising a recording layer with a succession of zones of material in a first amorphous state and a second crystalline state respectively. According to the invention the information medium may also comprise a resistive protective layer covering one write/read surface of the recording layer. The resistivity of this layer is lower than the resistivity of the material of the recording layer in each of the physical states.

Due to its low resistivity the protective layer does not prevent information from being written in the various zones by modifying its crystalline or (amorphous) state by means of an electric current.

Furthermore, according to the method of the invention the protective layer does not constitute an obstacle for reading whereas said layer would render the reading methods of the prior art inoperative.

The information medium may also comprise an electrical conductor layer that constitutes an electrode and that covers a surface of the recording layer facing the write/read surface.

Finally, the invention also relates to a method for writing encoded information on an information medium, as described above.

The method comprises writing phases during which a conductor writing point is applied to a writing face of the information medium in order to create localised heating using electricity that is sufficient to cause a phase change of the material in a zone of the recording layer. The method also comprises displacement phases during which the writing point is remote from the writing surface of the information medium and during which a relative displacement of the point and the information medium is effected in order to position the point opposite a new zone of the recording layer.

According to one particular implementation of the method, when the point is applied to the reading surface a current is sent through the recording layer, the current being selected (depending on the encoded information) between a first value that establishes a zone of the recording layer in an amorphous state and a second value that establishes a zone of the recording layer in a crystalline state.

The writing current sent through the recording layer is caused by applying a voltage between the conductor point and the conductor electrode on the surface facing the reading surface. The writing current may have a low initial value that slightly heats the material of the recording layer and renders it locally crystalline. On the other hand, the second, higher value heats the material to a higher degree and renders it amorphous.

In order to write encoded information on a recording medium that is initially amorphous the second value of the current may be chosen to be zero (except to erase).

The point is considered to be applied to the write/read surface when the point is in direct contact with the recording layer (when said layer is not provided with a protective layer) or when the point is in contact with said protective layer (when the recording layer is provided with such a layer).

The writing method in which the point is remote during the relative displacement of the support and point minimises the wear on these components.

According to one version of the writing method the writing point and an electrode in contact with a surface opposite the writing surface may also be used as capacitor plates to cause capacitive heating of a zone of the recording layer.

Other characteristics and advantages of the present invention will be better understood from the following detailed description. The description is of a non-limitative example and refers to the attached figures.

BRIEF DESCRIPTION OF THE FIGURES

FIG. 1, described above, is a simplified schematic drawing of a known system for reading and writing information and part of an associated information medium.

FIG. 2, described above, is a simplified schematic drawing of another a known system for reading information and part of an associated information medium.

FIG. 3, described above, is a diagram of the current/voltage characteristics of the reading apparatus of FIG. 2.

FIG. 4 is a simplified schematic drawing of a field detection apparatus that can be used in the reading method of the invention and an information medium capable of being read by the detection apparatus.

FIG. 5 is a simplified schematic drawing of another field detection apparatus that can be used in the reading method of the invention and a version of the information medium capable of being read by the apparatus of the invention.

FIGS. 6A–D show timing diagrams to illustrate the method for writing encoded information on an information medium.

DETAILED DESCRIPTION OF MODES FOR IMPLEMENTING THE INVENTION

In the following text parts that are identical, similar or that match those in FIGS. 4 to 6 bear the same references to avoid repeating the detailed description of said parts for each figure.

FIG. 4 is a schematic drawing of an information medium 1 similar to that in FIG. 1 and a field detection apparatus 100.

Information medium 1 comprises a substrate medium 10, a conductor layer 12 that constitutes an electrode and a layer 14 of a material with zones 14a in an amorphous state and zones 14c in a crystalline state. The material of layer 14 is, for example, made of a $Ge_2Sb_2Te_5$ alloy, silicon or a II–IV or III–V compound. The size, succession or distance between the crystalline and amorphous zones constitute an encoding that matches the information data recorded. The data may, for example, result from image or sound sampling or any physical magnitude.

According to the invention a field detection apparatus 100 is used to read the medium.

Field detection apparatus 100 is an apparatus known in itself and particularly uses Maxwell stress to detect surface potentials in microscopy techniques.

The apparatus comprises a flexible beam 119. A first end of beam 119 is equipped with a reading (and possibly writing) point 120 made of an electric conductor material. The second end of the beam is constructed as part of a support.

In the example shown, the second end is constructed as part of an actuator 131 that enables the end to be displaced perpendicularly and parallel to the surface of the information medium.

A perpendicular displacement of the information medium increases or reduces distance d separating the end of point 120 from the write/read surface of medium 1. Distance d is set, for example, to a value between 10 nm and 100 nm.

A displacement parallel to the surface of the information medium also enables the reading surface to be scanned when the encoded information is read.

A source of AC voltage 136 connected to the reading point via beam 119 is provided to supply an AC voltage to said point. The voltage is defined relative to a mass potential also applied to electrode 12 of the information medium. In one version the potential of electrode 12 may also be eccentric compared to the mass potential.

The AC voltage applied to the reading point creates electrostatic force that is applied to the reading point at the frequency of the AC voltage. Said electrostatic force causes reading point 120 to displace (deflect) and beam 119 to flex according to the frequency of the AC voltage.

Apparatus 135 that measures the displacement (deflection) of measuring point 120 and therefore also indirectly the force applied to said point. Measuring apparatus 135 is, for example, a piezoresistive probe on beam 119 or means for measuring the deflection of a laser beam after it has been reflected on beam 119.

An additional source of DC voltage 134 is provided to apply an additional source of DC voltage (relative to the mass for example) to the reading point, the value of which is set such that it cancels the electrostatic force at the frequency of the AC voltage applied to reading point 120.

In particular, the value of the DC voltage is set such that apparatus 135 for measuring the displacement of the measuring point indicates a position of the point (or deflection of the beam) that corresponds to a state in which the reading point is subjected to a zero electrostatic force. An arrow shows the possibility of slaving the value of the voltage supplied by source 134 to the zigzag displacement of the point.

More precisely, the measuring point is subjected to an electrostatic force of amplitude F such that:

$$F = \frac{dC}{dz} \cdot V_{AC} \cdot V$$

In this expression $V_{ac}$ refers to the value of the AC voltage supplied by the AC voltage source, $$\frac{dC}{dz}$$

is the derivative of a capacitance created between reading point 120 and the information medium (relative to the space between the plates of the capacitor) and V is the difference in DC voltage between the reading point and the recording medium.

The force applied to the point is zero when the DC voltage $V_{DC}$ between reading point 120 and electrode 12 of the information medium is such that V=0. This is the case when voltage $V_{DC}$ is equal in amplitude to a potential of the recording medium.

It is therefore possible to detect, for example, potentials linked to the succession of zones or interfaces between the amorphous and crystalline zones of the recording layer of the information medium.

The DC voltage applied to the point to cancel the electrostatic force may be considered a reading value provided by the apparatus.

FIG. 5 shows a version of the information medium and another type of apparatus for detecting electrical fields that can be used to implement the reading method of the invention.

Information medium 1 of FIG. 5 is more or less identical to that in FIG. 4 and the components of which it consists need therefore not be described further. It differs nevertheless in that it has a protective layer 16 of a resistive material such as ITO (Indium Tin Oxide) or SiC that covers the recording layer. The free surface of the protective layer therefore constitutes a new write/read surface.

The material selected for the protective layer has lower resistivity than that of the crystalline or amorphous zones. It does not therefore prevent the information encoded in recording layer 14 from being either read or written. The thickness of the protective layer is, for example, 5 nm and its resistivity is $10^{-1}$ Ω·cm.

The electrical field detection apparatus 101, which is summarily shown in FIG. 5, is an apparatus known in itself in electrical force microscopy techniques.

The apparatus comprises a reading point 120 born by a flexible beam 119, similar to the apparatus in FIG. 4.

The point is always held at a certain distance d from the reading surface constituted by the recording layer or the protective layer to enable contact-free reading.

However, no voltage is applied to the reading point in the example in FIG. 5. The point, which is constructed as part of flexible beam 119, is set to oscillate mechanically more or less at the resonance frequency of the assembly consisting of the beam and the point. The point may be set to oscillate, for example, by a piezoelectric actuator 137 constructed as part of beam 119.

The apparatus for measuring the displacement of the point (or deflection of the beam) is designed to detect variations of phase, amplitude and/or oscillation frequency of the point.

The reading point passing over the zones of recording layer 14 has distinct physical states that result, for example, in modifications of the amplitude and oscillations of the reading point.

Detecting the variations enables the transitions of a amorphous zone to a crystalline zone or a crystalline zone to an amorphous zone to be recognised.

The oscillation variations detected by measuring apparatus 135 therefore enable the information encoded in the recording layer to be read.

It should be noted that the apparatuses for detecting electrical fields are known in themselves. A more complete description of these apparatuses and their standard fields of use is given, for example, in documents (1), (2), (3) and (4) the references of which are given at the end of the present description.

It should also be noted that the electrode layer 12 of information medium 1 seen in FIG. 5 does not contribute in any way to reading the recording layer with field detection apparatus 101 of FIG. 5. This layer could be omitted. Furthermore, the information medium in FIG. 5, which is equipped with the electrode layer, can be read by field detection apparatus 100 of FIG. 4.

Electrode layer 12 can be used to pass a writing current through the recording layer in order to cause heating and a corresponding modification of the state of the material of this layer in determined zones.

FIGS. 6A–D show graphs and timing diagrams of a writing method using the conducting reading point of the apparatuses described above as reading points.

Reading/writing point 120 is periodically brought into contact and then moved away from the surface of the information medium, i.e. lowering and raising the point with actuator 131 seen in FIGS. 4 and 5.

The rate of the lowering and raising operations of the point is controlled by pulses from clock Ck shown by the graph in section A of FIG. 6.

Section C of FIG. 6 shows that point 120, which is shown several times during time t, is lowered and in contact with the information medium such that it synchronises with each pulse of the clock and is raised between two pulses. The lowered and raised positions of the point are shown by letters B and H respectively of the graph (section C).

When point 120 is raised a relative displacement between the point and the information medium occurs such that recording layer 14 is scanned during the writing procedure.

Section B in FIG. 6 is a graph that shows the current passing through reading/writing point 120 over time. It should be noted that the current is used to write the information encoded in the recording layer by local modification of its physical state.

Current pulses are applied to the recording layer in synchronisation with certain clock pulses and a current of zero or a different value is applied for other pulses in order to create a coding for the information to be recorded (between 20 and 150 nA). These values depend on the material itself, the thickness of the layers, etc. and the shape of the point.

As an example, the pulses of current may correspond to logic 1-type data and an absence of pulses to logic 0-type data.

Section D in FIG. 6 is a schematic drawing of a recording layer that was initially amorphous and locally crystallised in response to pulses of current in section B in the figure.

In this layer crystallised zones 14c correspond, for example, to a logic 1 state and amorphous zones 14a to logic 0 states.

Documents Cited (1)

"Determination of sign of surface charges of ferroelectric force microscope TGS using electrostatic force microscope combined with the voltage modulation technique"

Junji Ohgami, Yasuhiro Sugawara, Seizo Morita, Eiji Nakamura and Toru Ozaki

Jpn. J. Appl. Phys. Vol. 35 (1996) pp. 2,734–2,739, part I, No. 5A, May 1996

(2)

"High density charge storage memory with scanning probe microscopy"

Ichiro Fujiwara, Sigeru Kojima and Jun'etsu Seto
Jpn. J. Appl. Phys. Vol. 35 (1996) pp. 2,764–2,769, part I, No. 5A, May 1996

(3)
MFM/EFM Imaging-Dimension-series $SPM_s$
Support note 206, §206.4.4
Scanning Probe Microscope-Instruction Manual chap. 13.
Magnetic & Electric Force Imaging—Digital Instruments.

(4)
MFM/EFM Imaging-Dimension-series $SPM_s$
Support note 206, §206.4
Scanning probe Microscope-Instruction Manual chap. 13.
Magnetic & Electric Force Imaging—Digital Instruments.

What is claimed is:

1. Method for reading an information medium comprising a recording layer with a succession of zones of material with distinct first and second physical states of the material respectively, wherein said method comprises:

providing means for detecting electrical fields; and scanning the recording layer with said means for detecting electrical fields.

2. Method of claim 1 for reading an information medium wherein the recording layer comprises a layer of material with a succession of zones with a crystalline state and an amorphous state respectively.

3. Method of claim 2 for reading an information medium wherein the recording layer is an alloy with a base of tellurium (Te), and/or indium (In), and/or copper (Cu), and/or chrome (Cr), and/or vanadium (V) and/or selenium (Se).

4. Method of claim 1 for reading an information medium wherein the recording layer is a layer of semiconductor material with a succession of zones with a first and second state of distinct doping respectively.

5. Method of claim 1 for reading an information medium wherein the recording layer is made of a silicon material of II–IV or III–V compounds.

6. Method of claim 1 for reading an information medium wherein the recording layer is a layer of material with a succession of zones with a first and second ferroelectric state respectively.

7. Method of claim 6 wherein the material is a PZT-type ferroelectric material.

8. Method of claim 1 wherein the recording layer is scanned with a field detection apparatus that comprises a beam with a reading point and at least one piezoelectric engine to impose an oscillatory movement on the beam.

9. Method of claim 1 wherein the recording layer is scanned with a field detection apparatus that comprises a beam with a reading point and means to apply electrostatic force to the point.

10. Recording medium suited to a reading method of claim 1 comprising a recording layer with a succession of zones of material in a first amorphous state and a second crystalline state respectively, characterized in that it also comprises a protective layer covering the recording layer, the resistivity of this layer being lower than the resistivity of the material of the recording layer in each of the physical states.

11. Recording medium of claim 10 also comprising an electrical conductor layer that covers a surface of the recording layer facing the protective layer.

12. Method for writing on an information medium intended to be read according to the method of claim 1, wherein said information medium comprises a recording layer made of a material capable of being subjected locally, due to a heating effect, to transitions of phase between an amorphous state and a crystalline state, said writing method comprising:

performing writing phases during which a conductor writing point is applied to a writing face of the information medium in order to create localized heating using electricity that is sufficient to cause a phase change of the material in a zone of the recording layer; and performing displacement phases during which the writing point is remote from the writing surface of the information medium and during which a relative displacement of the point and information medium is effected in order to position the point opposite a new zone of the recording layer.

13. Method of claim 12 wherein during the writing phase heating is created by passing an electrical current through the recording layer between the writing point and an electrode in contact with a surface of the recording layer opposite the writing surface.

14. Method for writing encoded information on an information medium of claim 13, wherein the current is selected (depending on the encoded information) between a first value that establishes a zone of the recording layer in an amorphous state and a second value that establishes a zone of the recording layer in a crystalline state.

15. Method of claim 14 for writing encoded information on a recording medium that is initially amorphous wherein the second value of the current is zero.

16. Method of claim 13 wherein during the writing phase capacitive heating is created of a zone of the recording layer by using the writing point and an electrode in contact with a surface facing the writing surface as capacitor plates.

* * * * *